United States Patent
Tseng et al.

(10) Patent No.: US 9,328,188 B2
(45) Date of Patent: May 3, 2016

(54) METHOD FOR PREPARING PHENOL-FORMALDEHYDE RESINS, RESIN MATERIALS AND METHOD FOR PREPARING RESIN MOLDING MATERIALS

(71) Applicant: INDUSTRIAL TECHNOLOGY RESEARCH INSTITUTE, Hsinchu (TW)

(72) Inventors: I-Min Tseng, Nantou (TW); Jinn-Jong Wong, Hsinchu (TW); Wen-Chuan Hsu, Hsinchu (TW); Hua-Tang Yue, Zhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/103,415

(22) Filed: Dec. 11, 2013

(65) Prior Publication Data
US 2014/0100308 A1 Apr. 10, 2014

Related U.S. Application Data

(63) Continuation-in-part of application No. 13/558,027, filed on Jul. 25, 2012, now abandoned.

(30) Foreign Application Priority Data
Dec. 29, 2011 (TW) .............................. 100149455 A

(51) Int. Cl.
C08G 14/04 (2006.01)
C08K 5/05 (2006.01)
(Continued)

(52) U.S. Cl.
CPC *C08G 14/04* (2013.01); *C08G 8/04* (2013.01); *C08G 8/08* (2013.01); *C08G 8/24* (2013.01);
(Continued)

(58) Field of Classification Search
CPC .............. C08G 8/06; C08G 8/04; C08G 8/24; C08G 14/04; C08L 61/06
See application file for complete search history.

(56) References Cited

U.S. PATENT DOCUMENTS 2,861,977 A * 11/1958 Baxter et al. .................... 524/14
5,091,499 A 2/1992 Chum et al.
(Continued)

FOREIGN PATENT DOCUMENTS

| CN | 101092472 A | 12/2007 |
|---|---|---|
| CN | 102127197 A | 7/2011 |

(Continued)

OTHER PUBLICATIONS

Ludwick, A. G., et al. "Phenolic Reins," in Encyclopedia of Chemical Processing, vol. 4 by Sunggyu Lee, 2006, p. 2092.*
(Continued)

*Primary Examiner* — Liam J Heincer
*Assistant Examiner* — Nicholas Hill
(74) *Attorney, Agent, or Firm* — Muncy, Geissler, Olds & Lowe, P.C.

(57) ABSTRACT

A method for preparing a phenol-formaldehyde resin is provided. The method includes extracting a biomass pyrolysis oil to obtain a first phenolic mixture, mixing the first phenolic mixture, furfural and an alkaline catalyst to proceed to a first polymerization reaction to form a phenol-formaldehyde resin precursor solution, and adding the alkaline catalyst to the phenol-formaldehyde resin precursor solution to proceed to a second polymerization reaction to form a phenol-formaldehyde resin solution. The disclosure also provides a resin material prepared from the phenol-formaldehyde resin. The disclosure further provides a method for preparing a resin molding material.

14 Claims, 4 Drawing Sheets

(51) Int. Cl.
*C08L 61/12* (2006.01)
*C08J 5/24* (2006.01)
*C08G 8/08* (2006.01)
*C08G 8/24* (2006.01)
*C08L 61/06* (2006.01)
*C08L 97/02* (2006.01)
*C08G 8/04* (2006.01)

(52) U.S. Cl.
CPC ... *C08J 5/24* (2013.01); *C08K 5/05* (2013.01); *C08L 61/06* (2013.01); *C08L 61/12* (2013.01); *C08L 97/02* (2013.01); *C08J 2361/06* (2013.01); *Y02P 30/10* (2015.11)

(56) References Cited

U.S. PATENT DOCUMENTS

| | | | |
|---|---|---|---|
| 5,223,601 | A | 6/1993 | Chum et al. |
| 5,235,021 | A | 8/1993 | Chum et al. |
| 5,977,253 | A | 11/1999 | Warakomski |
| 6,818,707 | B2 | 11/2004 | Walisser |
| 6,844,420 | B1 | 1/2005 | Freel et al. |
| 7,642,333 | B2 | 1/2010 | Qureshi et al. |

FOREIGN PATENT DOCUMENTS

| | | |
|---|---|---|
| CN | 102174159 A | 9/2011 |
| EP | 1311615 A1 | 5/2003 |
| JP | 60-206883 | 10/1985 |
| TW | 416967 | 1/2001 |
| TW | 593524 | 6/2004 |
| WO | WO 01/09243 A1 | 2/2001 |

OTHER PUBLICATIONS

Carlos Amen-Chen et al., "Separation of Phenols from *Eucalyptus* Wood Tar" *Biomas and Bioenergy*, 1997, vol. 13, Nos. 1/2, pp. 25-37.

Helena Chum et al., "Biomass Pyrolysis Oil Feedstocks for Phenolic Adhesives" 1989, Chapter 11, ACS Symposium Series, 385, pp. 135-151.

S. Czernik et al., "Overview of Applications of Biomass Fast Pyrolysis Oil" *Energy & Fuels*, 2004, 18, pp. 590-598.

Edwin Dorrestijn et al., "The occurrence and reactivity of phenoxyl linkages in lignin and low rank coal" *Journal of Analytical and Applied Pyrolysis*, 2000, (54), pp. 153-192.

A. Effendi et al., "Production of renewable phenolic resins by thermochemical conversion of biomass: A review" *Renewable and Sustainable Energy Reviews*, 2008, 12, pp. 2092-2116.

Adam, J., et al., "Pyrolysis of biomass in the presence of Al-MCM-41 type catalysts," Fuel, 2005, 1494-1502.

Qi, Z., et al., "Review of biomass pyrolysis oil properties and upgrading research," Energ. Convers. Manage., 2007, 48, 87-92.

Office Action issued on May 21, 2014 for the corresponding Chinese application No. 201210131407.9.

* cited by examiner

METHOD FOR PREPARING PHENOL-FORMALDEHYDE RESINS, RESIN MATERIALS AND METHOD FOR PREPARING RESIN MOLDING MATERIALS

CROSS REFERENCE TO RELATED APPLICATIONS

This application is a Continuation-In-Part of application Ser. No. 13/558,027, filed on Jul. 25, 2012, which claims priority of Taiwan Patent Application No. 100149455, filed on Dec. 29, 2011, the entirety of which is incorporated by reference herein.

TECHNICAL FIELD

The technical field relates to a method for preparing a phenol-formaldehyde resin from biomass pyrolysis oil.

BACKGROUND

To seek a resource alternative to petroleum, is currently, a world-wide common concerned topic, due to limited petroleum reserves and emissions of a large amount of greenhouse gases of carbon dioxide ($CO_2$) when processing and employing petroleum, which causes global warming and threatens the living environment of mankind into the future. Advanced nations such as Europe and the United States, etc. have devoted themselves to developing renewable resources as substitutes for petrochemical raw materials and have thought to regulate petrochemical processing products to contain considerable proportions of renewable materials. This shows that there is a need to develop renewable materials and related processing technologies to maintain sustainable development of related industries.

Lignocellulose is a natural polymer with renewability and is mainly composed of carbon, hydrogen and oxygen, wherein lignin is non-petrochemical resource which provides renewable phenolic compounds or aromatic compounds in nature. Cellulose produces levoglucosan through pyrolysis. Performing a fast pyrolysis treatment and chemical treatment on a lignocellulose is the effective methods of transference from a solid state into a liquid state to obtain usable phenolic compounds.

In terms of applications of phenolic compounds, phenol-formaldehyde resin was the earliest to be developed and applied as synthetic resin. Its processed products include adhesives, paints, molding materials, electronic substrates, electrical insulating materials, heat insulating materials, etc. and its hardening resin can further be applied to carbon materials with special functionality after carbonization.

Therefore, if lignocellulose can be effectively used, on one hand, the issue of disposal of agricultural and forestry wastes and lignin wastes can be resolved. On the other hand, it can also provide alternative renewable materials to petroleum.

SUMMARY

The disclosure provides a method for preparing a phenol-formaldehyde resin from biomass pyrolysis oil to reduce dependence on petrochemical raw materials.

The disclosure provides a method for preparing a phenol-formaldehyde resin from biomass pyrolysis oil, comprising the following steps: extracting a biomass pyrolysis oil to obtain a first phenolic mixture; and polymerizing the first phenolic mixture to form a phenol-formaldehyde resin solution under an aldehyde, an alcohol and an alkaline catalyst.

The disclosure further comprises diluting the phenol-formaldehyde resin solution to form a phenol-formaldehyde resin diluent.

The disclosure further provides a resin material, comprising: a matrix impregnated with the prepared phenol-formaldehyde resin diluent.

The disclosure further provides a method for preparing a resin molding material, comprising the following steps: providing a biomass pyrolysis oil extract; polymerizing the biomass pyrolysis oil extract to form a stratified solution under an aldehyde, an alcohol and an alkaline catalyst, wherein the biomass pyrolysis oil extract is polymerized at 70-90° C. for 0.5-2 hours; diluting an under-layer solution of the stratified solution with an alcohol to form a diluent; impregnating a matrix with the diluent; and drying, pulverizing and molding the matrix.

The disclosure further provides a method for preparing a phenol-formaldehyde resin, comprising the following steps: extracting a biomass pyrolysis oil to obtain a first phenolic mixture; mixing the first phenolic mixture, furfural and an alkaline catalyst to proceed to a first polymerization reaction to form a phenol-formaldehyde resin precursor solution; and adding the alkaline catalyst to the phenol-formaldehyde resin precursor solution to proceed to a second polymerization reaction to form a phenol-formaldehyde resin solution.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawing, wherein.

DETAILED DESCRIPTION

Figure 1:
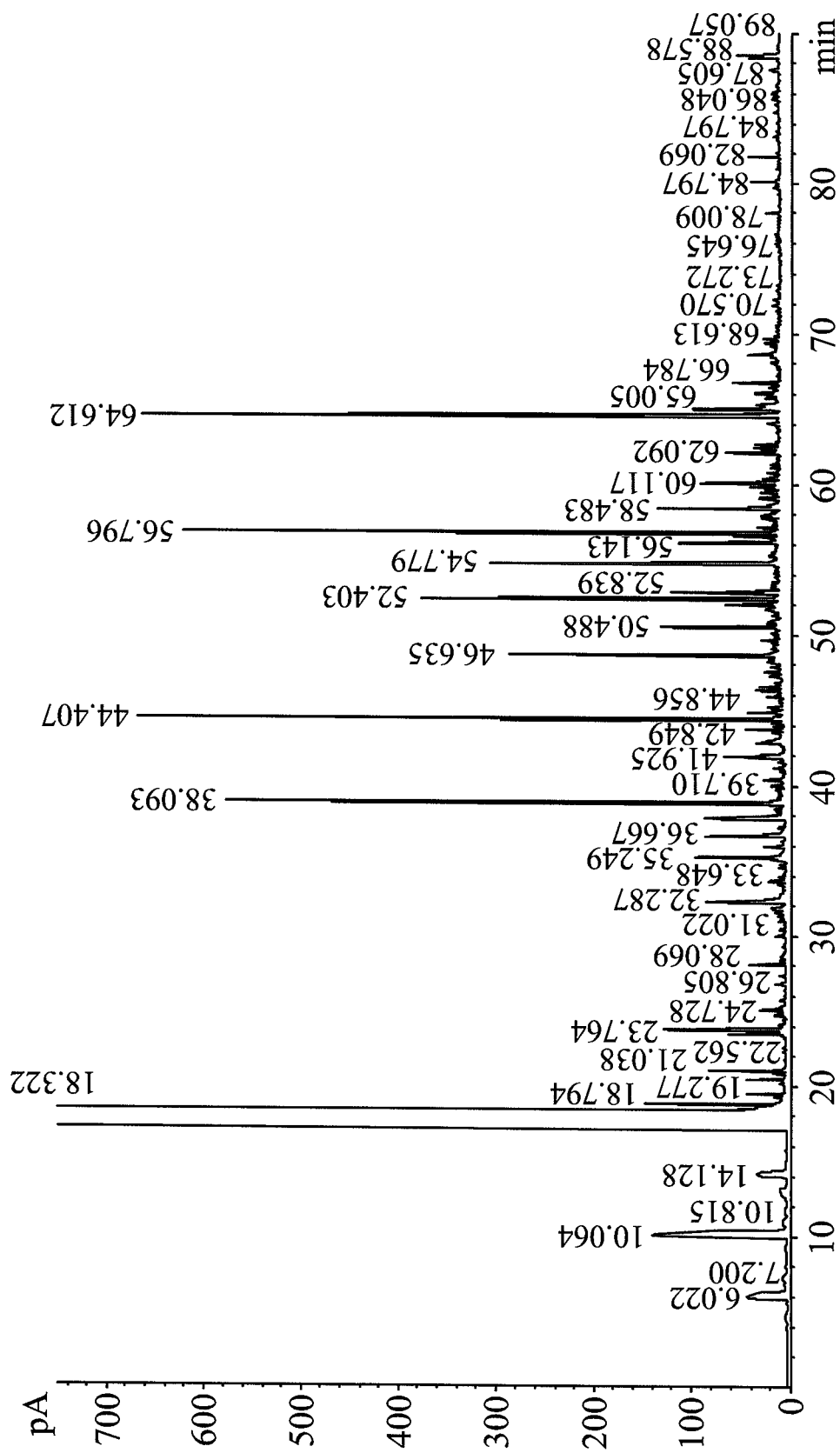
FIG. 1 is a GC analysis diagram of an extracted phenolic compound sample in accordance with an Example 1 of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

One embodiment of the disclosure provides a method for preparing a phenol-formaldehyde resin from biomass pyrolysis oil, comprising the following steps. First, a biomass pyrolysis oil is extracted to obtain a first phenolic mixture. The first phenolic mixture is then polymerized to form a phenol-formaldehyde resin solution under an aldehyde, an alcohol and an alkaline catalyst.

The biomass pyrolysis oil is obtained from pyrolysis of a biomass. The biomass may comprise softwood (such as Japanese cedar), hardwood, grasses or lignin.

The first phenolic mixture extracted from the biomass pyrolysis oil may comprise at least two of phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methylpyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol, 3-allyl-6-methoxy phenol or the like.

In the disclosure, the biomass pyrolysis oil is extracted by an extractant.

In an embodiment, the first phenolic mixture extracted from the biomass pyrolysis oil may also be used as an extractant to extract the biomass pyrolysis oil.

In an embodiment, the extractant may comprise a solvent such as ethyl acetate, propyl acetate, butyl acetate, methyl isopropyl ketone (MIPK), methyl isobutyl ketone (MIBK), methyl i-amyl ketone (MIAK), ethyl ethyl ketone (EEK) or toluene. The solvent and the biomass pyrolysis oil have a weight ratio of about 0.1:1-1:1.

In an embodiment, the aldehyde added in the polymerization of the first phenolic mixture may comprise formaldehyde, glycolaldehyde, propanal, m-hydroxybenzaldehyde, vanillin, 2,3-dihydroxy benzaldehyde, m-hydroxy benzaldehyde or 5-methyl-2-furfural. The aldehyde and the first phenolic mixture have a weight ratio of about 0.1:1-1:1 or 0.3:1-0.8:1. The added alcohol may comprise ethanol, methanol, n-propanol, isopropanol, n-butanol, isobutanol, n-pentanol, n-hexanol or t-butanol. The alcohol and the first phenolic mixture have a weight ratio of about 0.1:1-10:1. Additionally, the added alkaline catalyst may comprise ammonia, a triethylamine aqueous solution, a triethyldiamine aqueous solution, a sodium hydroxide aqueous solution, a potassium hydroxide aqueous solution or a barium hydroxide aqueous solution.

In some embodiments, when the solvent is used as the extractant, a third phenolic compound may further be added under the aldehyde, the alcohol and the alkaline catalyst to polymerize the first phenolic mixture. The third phenolic compound added in the polymerization of the first phenolic mixture may comprise phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methylpyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol, 3-allyl-6-methoxy phenol or the like, or a combination thereof. The third phenolic compound and the first phenolic mixture have a weight ratio of about 0.5:1-2:1.

In another embodiment, the extractant may further comprise a second phenolic compound in addition to the solvent. The second phenolic compound may comprise phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methylpyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol, 3-allyl-6-methoxy phenol or the like, or a combination thereof. The second phenolic compound and the biomass pyrolysis oil have a weight ratio of about 0.1:1-1:1 or 0.1:1-0.5:1.

In another embodiment, when the second phenolic compound and the solvent are used as the extractant, a fourth phenolic compound may further be added under the aldehyde, the alcohol and the alkaline catalyst to polymerize the first phenolic mixture. The fourth phenolic compound added in the polymerization of the first phenolic mixture may comprise phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methylpyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol, 3-allyl-6-methoxy phenol or the like, or a combination thereof. The fourth phenolic compound and the biomass pyrolysis oil have a weight ratio of about 0.1:1-0.5:1. In an embodiment, the fourth phenolic compound is similar to the first phenolic mixture. The fourth phenolic compound and the first phenolic mixture have a weight ratio of about 0.1:1-0.5:1.

In the disclosure, the phenol-formaldehyde resin solution is further diluted to form a phenol-formaldehyde resin diluent. In an embodiment, the phenol-formaldehyde resin solution is diluted with an alcohol, for example, ethanol, methanol, n-propanol, isopropanol, n-butanol, isobutanol, n-pentanol, n-hexanol or t-butanol. The alcohol and the phenol-formaldehyde resin solution have a weight ratio of about 0.1:1-10:1. In the disclosure, a matrix is impregnated with the phenol-formaldehyde resin diluent to form a resin-impregnated material. The matrix may comprise lignocellulose powder (such as wood powder or bamboo powder), paper (such as kraft paper) or fabric (such as cloth). In an embodiment, wood powder is impregnated with the phenol-formaldehyde resin diluent to form a resin-impregnated wood powder material.

In the disclosure, the resin-impregnated material is further hot-pressed to form a resin molding material. In an embodiment, a resin-impregnated wood powder material is hot-pressed to form a bakelite molding material.

One embodiment of the disclosure provides a resin material comprising a matrix impregnated with the prepared phenol-formaldehyde resin diluent.

The matrix may comprise lignocellulose powder (such as wood powder or bamboo powder), paper (such as kraft paper) or fabric (such as cloth).

In the disclosure, the biomass pyrolysis oil is prepared into the resin molding material such as bakelite molding material. The disclosure discloses a method for preparing a phenol-formaldehyde resin molding material from biomass pyrolysis oil.

One embodiment of the disclosure provides a method for preparing a resin molding material, comprising the following steps. First, a biomass pyrolysis oil extract is provided. The biomass pyrolysis oil extract is polymerized at about 70-90° C. for about 0.5-2 hours to form a stratified solution under an aldehyde, an alcohol and an alkaline catalyst. An under-layer solution of the stratified solution is then diluted with an alcohol to form a diluent. A matrix is impregnated with the diluent. The matrix is then dried, pulverized and molded.

One embodiment of the disclosure provides a method for preparing a phenol-formaldehyde resin, comprising the following steps. First, a biomass pyrolysis oil is extracted to obtain a first phenolic mixture. The first phenolic mixture, furfural and an alkaline catalyst are mixed to proceed to a first polymerization reaction to form a phenol-formaldehyde resin precursor solution. The alkaline catalyst is then added to the phenol-formaldehyde resin precursor solution to proceed to a second polymerization reaction to form a phenol-formaldehyde resin solution.

In some embodiments, the first polymerization reaction has a reaction temperature greater than or equal to 130° C. and smaller than or equal to 160° C., for example, ranging from 130° C. to 160° C., and the second polymerization reaction has a reaction temperature greater than or equal to 70° C. and smaller than 130° C., for example, ranging from 70° C. to 120° C.

In the disclosed preparation method for a phenol-formaldehyde resin, an alcohol is further added during the first polymerization reaction or the second polymerization reaction. In some embodiments, the added alcohol may comprise ethanol, methanol, n-propanol, isopropanol, n-butanol, isobutanol, n-pentanol, n-hexanol or t-butanol, and the alcohol and the first phenolic mixture have a weight ratio of about 0.1:1-10:1.

In some embodiments, the furfural and the first phenolic mixture have a weight ratio of about 0.1:1-4:1 or 1:1-4:1. Additionally, in some embodiments, the added alkaline catalyst may comprise ammonia, a triethylamine aqueous solution, a triethyldiamine aqueous solution, a sodium hydroxide aqueous solution, a potassium hydroxide aqueous solution or a barium hydroxide aqueous solution.

Example 1

Preparation of the Resin Molding Material (1)

First, 525 g of a Japanese cedar pyrolysis oil (preparation of a Japanese cedar pyrolysis oil referred to Chih-Chiang Chang, et al., "Fast Pyrolysis of Sawdust in a Bubbling Fluidized Bed to Produce Bio-oil", The 13th Asia Pacific Confederation of Chemical Engineering Congress, Oct. 5-8, 2010, Taipei) was extracted by adding 420 g of ethyl acetate and filtered to obtain a filtrate. The filtrate was separated into various phases through a reparatory funnel. 581 g of a solvent phase was collected and washed by 418 g of water to form a mixing solution. The mixing solution was stood and separated into various phases. 470 g of a hydrophobic phase was collected and the pH thereof was adjusted to about 7.7 by adding 471 g of 5% sodium bicarbonate to form a neutralizing solution. The neutralizing solution was stood and separated into various phases. A hydrophobic phase was collected and evaporated by a rotary evaporator to obtain a sample of a first phenolic mixture. The first phenolic mixture sample was diluted by adding 3-fold MIBK and analyzed by GC. The GC analysis conditions and the compositions of the first phenolic mixture sample are as follows.

GC analysis conditions:
Agilent 7890A
Column: DB-5 ms (60 m×250 μm×1 μm)
Injection temperature: 280° C.
Column flow rate: He, 2 mL/min
Injection split ratio: no split
Injection volume: 0.1 μL
Heating procedure: 40° C. (5 min)→warming 3° C./min→280° C. (5 min)

The compositions of the first phenolic mixture sample comprised phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methylpyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol and 3-allyl-6-methoxy phenol. A GC analysis diagram is shown in FIG. 1. It can be compared to the content in Table 1.

TABLE 1

| Retention time | Chemical name | Formula |
|---|---|---|
| 32.29 | phenol | |
| 36.67 | 2-cresol | |
| 37.85 | 4-cresol | |
| 38.50 | 3-cresol | |
| 38.89 | guaiacol | |
| 39.29 | 2,6-dimethyl-phenol | |
| 41.92 | 2,4-dimethyl-phenol | |
| 43.53 | 4-ethylphenol | |
| 43.93 | m-ethylphenol | |
| 44.40 | 1,2-benzenediol | |
| 44.85 | 3,4-xylenol | |

TABLE 1-continued

| Retention time | Chemical name | Formula |
|---|---|---|
| 45.93 | 4-ethyl-m-cresol | |
| 46.71 | 3-methoxycatechol | |
| 47.54 | 3-methylpyrocatechol | |
| 47.86 | 1,4-benzenediol | |
| 48.19 | 4-ethylguaiacol | |
| 48.63 | 4-methyl catechol | |
| 50.49 | 4-vinyl-2-methoxy-phenol | |
| 50.75 | 2-methyl-1,4-benzenediol | |
| 52.05 | 2,6-dimethoxyphenol | |
| 52.40 | 2-methoxy-4-propyl-phenol | |
| 54.78 | Isoeugenol | |
| 56.79 | 2-methoxy-4-propyl-phenol | |

TABLE 1-continued

| Retention time | Chemical name | Formula |
|---|---|---|
| 57.13 | Trans-Isoeugenol | |
| 66.78 | 2,6-dimethoxy-4-allylphenol | |
| 68.09 | 3-allyl-6-methoxyphenol | |

Figure 4:
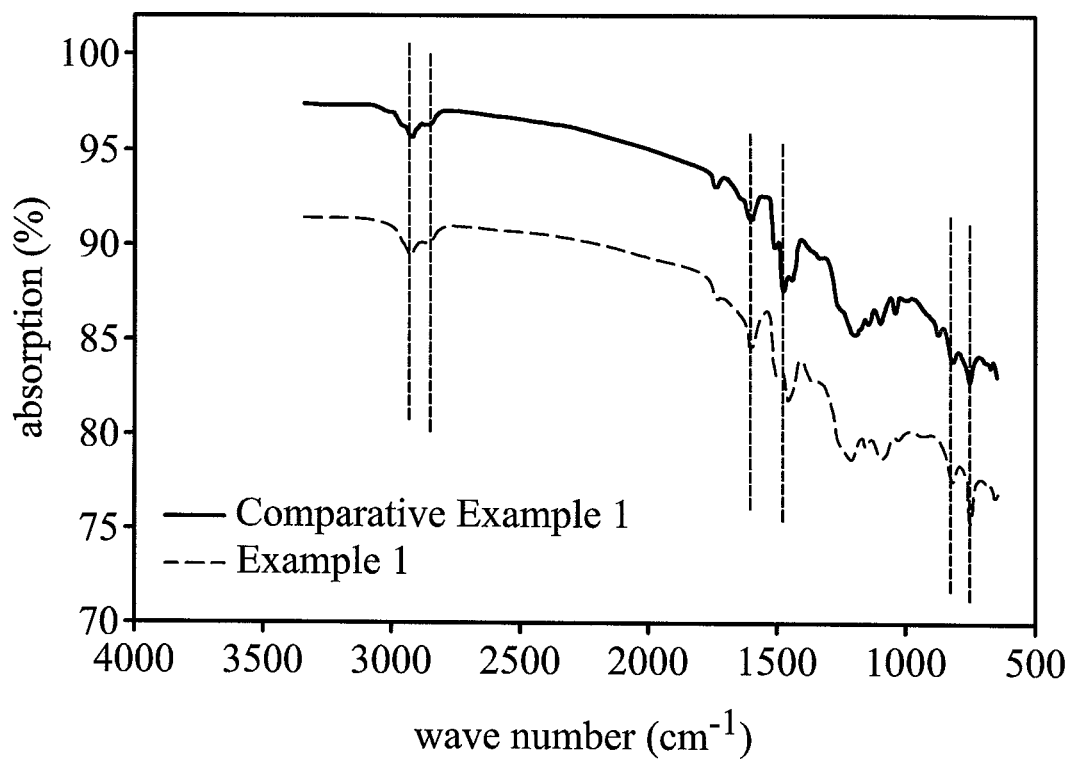
FIG. 4 is an FTIR diagram of the phenol-formaldehyde resin solutions of Example 1 and Comparative Example 1, wherein the dotted line represents Example 1 and the solid line represents Comparative Example 1.

47 g of the first phenolic mixture sample, 130 g of formalin, 47 g of phenol (the third phenolic compound) and 30 ml of ethanol were mixed in a reaction flask and heated. Formalin was an aqueous solution containing 37 wt % of formaldehyde. 10 ml of ammonia was added to the reaction flask and reacted at 80° C. for 1 hour. After cooling to room temperature, the solution in the reaction flask was stood and separated into various phases. 165 g of an under-layer phenol-formaldehyde resin solution was collected. The phenol-formaldehyde resin solution was determined by FTIR (as shown in FIG. 4). The phenol-formaldehyde resin solution was diluted with 231 g of ethanol. 396 g of a phenol-formaldehyde resin diluent was obtained.

100 g of wood powder (Malacca acacia wood powder, particle size: 100 mesh) was poured into 175 g of a phenol-formaldehyde resin diluent and impregnated therewith for 24 hours to form a resin-impregnated wood powder. After drying, the resin-impregnated wood powder was pulverized by a grinder and pressed (180° C.) by a hydraulic molding machine to form a resin molding material (bakelite molding material). The internal bonding strength thereof was $41.1 \pm 2.9$ $kg_f/cm^2$.

Example 2

Preparation of the Resin Molding Material (2)

Figure 2:
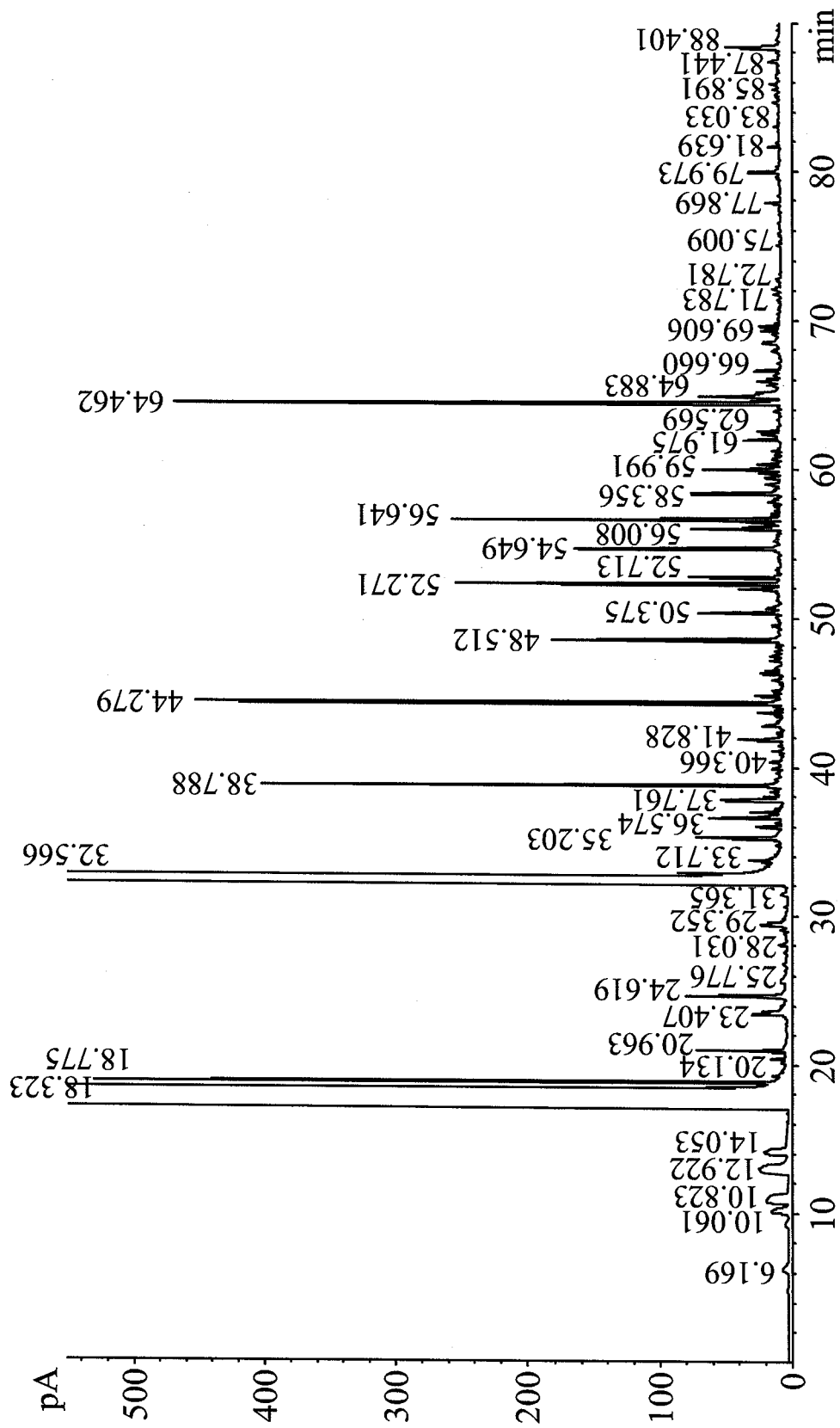
FIG. 2 is a GC analysis diagram of an extracted phenolic compound sample in accordance with an Example 2 of the disclosure.

First, 479 g of a Japanese cedar pyrolysis oil was extracted by adding 48 g of ethyl acetate and 105 g of phenol (Japanese cedar pyrolysis oil/ethyl acetate=1/0.1, Japanese cedar pyrolysis oil/phenol=1/0.22) and filtered to obtain a filtrate. The filtrate was separated into various phases through a separatory funnel. 435.5 g of a solvent phase was collected and washed by 357.34 g of water to form a mixing solution. The mixing solution was stood and separated into various phases. 309 g of a hydrophobic phase was collected and the pH thereof was adjusted to about 7.3 by adding 412 g of 5% sodium bicarbonate to form a neutralizing solution. The neutralizing solution was stood and separated into various phases. A hydrophobic phase was collected and evaporated by a rotary evaporator to obtain a sample of a first phenolic mixture. The first phenolic mixture sample was diluted by adding 3-fold MIBK and analyzed by GC. The GC analysis conditions were similar to Example 1. A GC analysis diagram is shown in FIG. 2. It can be compared to the content in Table 2.

TABLE 2

| Retention time | Chemical name | Formula |
|---|---|---|
| 32.56 | phenol | |
| 36.57 | 2-cresol | |
| 37.76 | 4-cresol | |
| 38.43 | 3-cresol | |
| 38.78 | guaiacol | |
| 41.82 | 2,6-dimethyl-phenol | |
| 42.75 | 2,4-dimethyl-phenol | |
| 43.60 | 4-ethylphenol | |
| 43.82 | m-ethylphenol | |
| 44.27 | 1,2-benzenediol | |
| 44.74 | 3,4-xylenol | |
| 45.82 | 4-ethyl-m-cresol | |
| 46.59 | 3-methoxycatechol | |
| 47.43 | 3-methylpyrocatechol | |
| 47.75 | 1,4-benzenediol | |
| 48.08 | 4-ethylguaiacol | |
| 48.51 | 4-methyl catechol | |
| 50.37 | 4-vinyl-2-methoxy-phenol | |
| 50.64 | 2-methyl-1,4-benzenediol | |
| 51.93 | 2,6-dimethoxyphenol | |
| 52.27 | 2-methoxy-4-propyl-phenol | |
| 54.64 | Isoeugenol | |
| 56.64 | 2-methoxy-4-propyl-phenol | |
| 57.02 | Trans-Isoeugenol | |

TABLE 2-continued

| Retention time | Chemical name | Formula |
|---|---|---|
| 66.66 | 2,6-dimethoxy-4-allylphenol | (structure) |
| 67.97 | 3-allyl-6-methoxyphenol | (structure) |

141 g of the first phenolic mixture sample, 195 g of formalin and 45 ml of ethanol were mixed in a reaction flask and heated. 15 ml of ammonia was added to the reaction flask and reacted at 80° C. for 1 hour. After cooling to room temperature, the solution in the reaction flask was stood and separated into various phases. 165 g of an under-layer phenol-formaldehyde resin solution was collected and diluted with 231 g of ethanol to prepare a phenol-formaldehyde resin diluent.

Next, 100 g of wood powder was poured into 175 g of a phenol-formaldehyde resin diluent and impregnated therewith for 24 hours to form a resin-impregnated wood powder. After drying, the resin-impregnated wood powder was pulverized by a grinder and pressed (180° C.) by a hydraulic molding machine to form a resin molding material (bakelite molding material). The internal bonding strength thereof was $39.7 \pm 2.8$ kg$_f$/cm$^2$.

Comparative Example 1

94 g of phenol and 130 g of formalin were mixed in a reaction flask and heated. 10 ml of ammonia was added to the reaction flask and reacted at 80° C. for 1 hour. After cooling to room temperature, the solution in the reaction flask was stood and separated into various phases. 165 g of an under-layer phenol-formaldehyde resin solution was collected and diluted with 231 g of ethanol to prepare a phenol-formaldehyde resin diluent. The phenol-formaldehyde resin diluent was determined by FTIR (as shown in FIG. 4).

Next, 100 g of wood powder was poured into 175 g of a phenol-formaldehyde resin diluent and impregnated therewith for 24 hours to form a resin-impregnated wood powder. After drying, the resin-impregnated wood powder was pulverized by a grinder and pressed (180° C.) by a hydraulic molding machine to form a resin molding material (bakelite molding material). The internal bonding strength thereof was $30.7 \pm 5.9$ kg$_f$/cm$^2$.

Comparative Example 2

94 g of phenol, 30 ml of ethanol and 130 g of formalin were mixed in a reaction flask and heated. 10 ml of ammonia was added to the reaction flask and reacted at 80° C. for 1 hour. After cooling to room temperature, the reaction flask was stood. However, the solution in the reaction flask could not be separated into various phases such that a phenol-formaldehyde resin diluent could not be prepared.

Comparative Example 3

First, 519 g of a Japanese cedar pyrolysis oil was extracted by adding 519 g of ethyl acetate (Japanese cedar pyrolysis oil/ethyl acetate=1/1) and filtered to obtain a filtrate. The filtrate was separated into various phases through a separatory funnel. 709 g of a solvent phase was collected and washed by 509 g of water to form a mixing solution.

Figure 3:
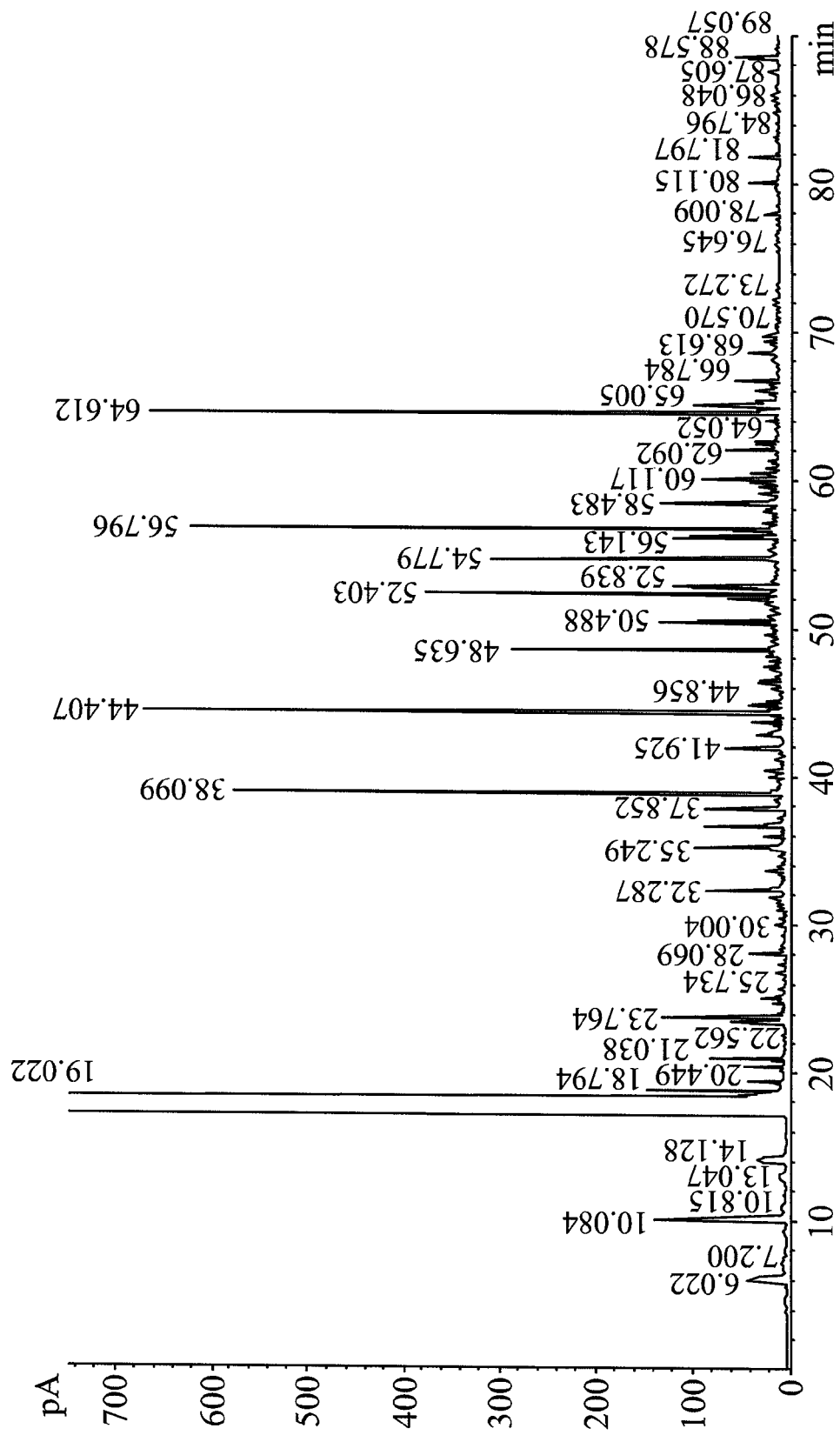
FIG. 3 is a GC analysis diagram of an extracted phenolic compound sample in accordance with a Comparative Example 3.

The mixing solution was stood and separated into various phases. 636 g of a hydrophobic phase was collected and the pH thereof was adjusted to about 7.35 by adding 713 g of 5% sodium bicarbonate to form a neutralizing solution. The neutralizing solution was stood and separated into various phases. A hydrophobic phase was collected and evaporated by a rotary evaporator to obtain a sample of a phenolic compound. The phenolic compound sample was diluted by adding 3-fold MIBK and analyzed by GC. The GC analysis conditions were similar to Example 1. A GC analysis diagram is shown in FIG. 3. It can be compared to the content in Table 3.

TABLE 3

| Retention time | Chemical name | Formula |
|---|---|---|
| 32.28 | phenol | (structure) |
| 36.66 | 2-cresol | (structure) |
| 37.85 | 4-cresol | (structure) |
| 38.50 | 3-cresol | (structure) |
| 38.89 | guaiacol | (structure) |
| 39.29 | 2,6-dimethyl-phenol | (structure) |
| 41.92 | 2,4-dimethyl-phenol | (structure) |
| 43.52 | 4-ethylphenol | (structure) |
| 43.93 | m-ethylphenol | (structure) |

TABLE 3-continued

| Retention time | Chemical name | Formula |
|---|---|---|
| 44.40 | 1,2-benzenediol | |
| 44.85 | 3,4-xylenol | |
| 45.93 | 4-ethyl-m-cresol | |
| 46.53 | 3-methoxycatechol | |
| 47.53 | 3-methylpyrocatechol | |
| 47.85 | 1,4-benzenediol | |
| 48.20 | 4-ethylguaiacol | |
| 48.63 | 4-methyl catechol | |
| 50.48 | 4-vinyl-2-methoxy-phenol | |
| 50.75 | 2-methyl-1,4-benzenediol | |
| 52.05 | 2,6-dimethoxyphenol | |
| 52.40 | 2-methoxy-4-propyl-phenol | |
| 54.77 | Isoeugenol | |
| 56.79 | 2-methoxy-4-propyl-phenol | |
| 57.13 | Trans-Isoeugenol | |
| 66.78 | 2,6-dimethoxy-4-allylphenol | |
| 68.09 | 3-allyl-6-methoxyphenol | |

94 g of the phenolic compound sample, 130 g of formalin and 21 g of phenol were mixed in a reaction flask and heated. 10 ml of ammonia was added to the reaction flask and reacted at 80° C. for 1 hour. After cooling to room temperature, the solution in the reaction flask was stood and separated into various phases. 165 g of an under-layer phenol-formaldehyde resin solution was collected. However, the phenol-formaldehyde resin solution was gelled and could not be prepared into a phenol-formaldehyde resin diluent by ethanol. Thus, a resin-impregnated molding material could not be prepared.

Example 3

Reactive Phenol Content in the Extract

Extractant: Ethyl Acetate

The standard method for testing the reactive phenol content was used, by adding formalin to a sample of a phenolic compound aqueous solution and polycondensing the phenolic compound and formaldehyde under strong acid to precipitate a polymeric solid-like substance. The precipitated product was dried in an oven with 103±2° C. until a constant weight thereof was achieved. The reactive phenol content was thus calculated by the sample weight and the dried product weight.

Japanese cedar pyrolysis raw oil was stood and separated into various phases. An oil phase was collected and tested. The reactive phenol content of the oil phase was 58%.

The procedure of separation of phenolic compound from the Japanese cedar pyrolysis oil in this Example was similar to Example 1, including extraction, washing, neutralization and evaporation. The extractant was ethyl acetate. The ratio of the Japanese cedar pyrolysis oil and the extractant was 1:1

(w/w). After extracting, washing, neutralizing and evaporating, the reactive phenol content of the obtained phenolic compound was 86%.

Example 4

Reactive Phenol Content in the Extract

Extractant: Phenol and Ethyl Acetate

The procedure of separation of phenolic compound from the Japanese cedar pyrolysis oil in this Example was similar to Example 2. The extractant was prepared by phenol and ethyl acetate. The ratio of the Japanese cedar pyrolysis oil and phenol was 1:0.22 (w/w). The ratio of the Japanese cedar pyrolysis oil and ethyl acetate was 1:0.1 (w/w). After extracting, washing, neutralizing and evaporating, the reactive phenol content of the obtained phenolic compound was greater than 99%.

Example 5

Preparation of the Phenol-Formaldehyde Resin (1)

39.3 g of the first phenolic mixture sample prepared from Example 1, 81.3 g of furfural, 110.7 g of water and 6.5 g of NaOH (40%) were mixed in a 1 L of reactor (stainless steel, SUS304) and heated to proceed to a first polymerization reaction at a stirring speed of 120 rpm, a pressure of 4 kg/cm$^2$G and a temperature of 150° C. for 0.5 hour to form a phenol-formaldehyde resin precursor solution. After cooling to 110° C., 14.3 g of NaOH (40%) was added to the phenol-formaldehyde resin precursor solution to proceed to a second polymerization reaction at a temperature of 110° C. and a pressure of 3 kg/cm$^2$G (by nitrogen). After 2 hours, 100 mL of ethanol was pumped into the phenol-formaldehyde resin precursor solution. After cooling to 70° C., liquid phenol-formaldehyde resin was obtained. A gelling test was performed. 10 g of resin sample and an iron wire with a spiral end were placed in a glass tube (length: 18 cm, inside diameter: 10 mm). The tube was placed in an oil bath (135±1° C.) and the experimenter began to count time. During the test, the iron wire was often pulled until when the iron wire was raised the tube was pulled up simultaneously. The time required was the gelling time. The gelling time of the liquid phenol-formaldehyde resin was 26 minutes.

Example 6

Preparation of the Phenol-Formaldehyde Resin (2)

39.68 g of the first phenolic mixture sample prepared from Example 1, 80.49 g of furfural, 111.45 g of water, 30.03 g of ethanol and 6.33 g of NaOH (40%) were mixed in a 1 L of reactor (stainless steel, SUS304) and heated to proceed to a first polymerization reaction at a stirring speed of 120 rpm, a pressure of 5.4 kg/cm$^2$G and a temperature of 150° C. for 0.5 hour to form a phenol-formaldehyde resin precursor solution. After cooling to 110° C., 14.5 g of NaOH (40%) was added to the phenol-formaldehyde resin precursor solution to proceed to a second polymerization reaction at a temperature of 110° C. and a pressure of 3 kg/cm$^2$G (by nitrogen). After 2 hours, the solution temperature was cooled to 70° C., and liquid phenol-formaldehyde resin was obtained. A gelling test was performed. 10 g of resin sample and an iron wire with a spiral end were placed in a glass tube (length: 18 cm, inside diameter: 10 mm). The tube was placed in an oil bath (135±1° C.) and the experimenter began to count time. During the test, the iron wire was often pulled until when the iron wire was raised the tube was pulled up simultaneously. The time required was the gelling time. The gelling time of the liquid phenol-formaldehyde resin was 26 minutes.

Comparative Example 4

25.32 g of the first phenolic mixture sample prepared from Example 1, 46.62 g of furfural, 67.34 g of water and 3.1 g of NaOH (40%) were mixed in a 500 mL of glass reaction flask and heated to proceed to a first polymerization reaction at a stirring speed of 250 rpm and a temperature of 80° C. for about 10 minutes. 7.73 g of NaOH (40%) was then added to proceed to a second polymerization reaction at a temperature of about 85° C. for 1 hour and a liquid product was obtained. A gelling test was performed. 10 g of resin sample and an iron wire with a spiral end were placed in a glass tube (length: 18 cm, inside diameter: 10 mm). The tube was placed in an oil bath (135±1° C.) and the experimenter began to count time. During the test, the iron wire was often pulled until when the iron wire was raised the tube was pulled up simultaneously. The time required was the gelling time. However, in the gelling test, no crosslinking of the liquid product was formed after 60 minutes.

Comparative Example 5

12.72 g of the first phenolic mixture sample prepared from Example 1, 12.9 g of petrochemical phenol, 46.67 g of furfural, 15 g of water and 3.13 g of NaOH (40%) were mixed in a 500 mL of glass reaction flask and heated to proceed to a first polymerization reaction at a stirring speed of 250 rpm and a temperature of 80° C. for about 10 minutes. 7.92 g of NaOH (40%) was then added to proceed to a second polymerization reaction at a temperature of 90° C. for 3 hours and a liquid product was obtained. A gelling test was performed. 10 g of resin sample and an iron wire with a spiral end were placed in a glass tube (length: 18 cm, inside diameter: 10 mm). The tube was placed in an oil bath (135±1° C.) and the experimenter began to count time. During the test, the iron wire was often pulled until when the iron wire was raised the tube was pulled up simultaneously. The time required was the gelling time. However, in the gelling test, no crosslinking of the liquid product was formed after 31 minutes.

Comparative Example 6

39.3 g of petrochemical phenol, 80.1 g of furfural, 110 g of water and 6.55 g of NaOH (40%) were mixed in a 1 L of reactor (stainless steel, SUS304) and heated to proceed to a first polymerization reaction at a temperature of 150° C., a stirring speed of 120 rpm and a pressure of 3.8 kg/cm$^2$G for 0.5 hour. After cooling to 110° C., 14.24 g of NaOH (40%) was added to proceed to a second polymerization reaction at a temperature of 110° C. and a pressure of 3 kg/cm$^2$G (by nitrogen). After 2 hours, a lump product was obtained.

Comparative Example 7

39.5 g of the first phenolic mixture sample prepared from Example 1, 80.6 g of furfural, 110 g of water and 6.51 g of NaOH (40%) were mixed in a 1 L of reactor (stainless steel, SUS304) and heated to proceed to a first polymerization reaction at a temperature of 150° C., a stirring speed of 120 rpm and a pressure of 3.8 kg/cm$^2$G for 0.5 hour. After cooling to 110° C., 14.29 g of NaOH (40%) was added to proceed to a second polymerization reaction at a temperature of 110° C. and a pressure of 3 kg/cm²G (by nitrogen). After 2 hours, the solution temperature was cooled to 70° C., and a lump product was obtained.

In Examples of the disclosure, the phenolic compounds with high reactivity were extracted from biomass pyrolysis oil by a novel extractant. The phenolic compound with high reactivity was used to synthesize phenol-formaldehyde resin under an alkaline catalyst by a novel synthesis method. The synthesized resin was applied to, for example, wood powder impregnation. The resin-impregnated wood powder was further prepared into bakelite molding materials through hot-pressing.

In Examples of the disclosure, the biomass pyrolysis oil was obtained from fast pyrolysis of a biomass such as agricultural and forestry wastes, and black liquor wastes from the paper industry or lignin. The extractant was prepared by phenolic compounds and a small amount of solvent. Thus, the extractant had high solubility to the phenolic compounds such that the phenolic compounds were easily extracted from the biomass pyrolysis oil thereby. Specifically, in the extractant, the amount of the solvent was merely 10% of the biomass pyrolysis oil. Thus, in the disclosure, the amount of the organic solvents, raw material cost and recovery cost were substantially reduced using the novel extractant. The phenolic compound with high reactivity separated from the biomass pyrolysis oil facilitates synthesis of resin. Additionally, in the novel synthesis method (for example addition of alcohol), the fluidity (for example viscosity) and reactivity of the phenolic compound and other reaction conditions were effectively controlled such that resin glue was successfully synthesized. Some materials such as wood powder were further impregnated with the resin glue to prepare bakelite molding materials.

In accordance with Examples of the disclosure, the reuse value of agricultural and forestry wastes, black liquor wastes from the paper industry and lignin was improved. The disclosed material is a renewable biomass resin material derived from natural plant wastes as raw materials, which reduces dependence on petrochemical raw materials and emission of carbon dioxide and slows global warming. Thus, the renewable biomass resin material is a sustainable-supply green chemical material.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for preparing a phenol-formaldehyde resin, comprising the following steps:
    extracting a biomass pyrolysis oil to obtain a first phenolic mixture;
    mixing the first phenolic mixture, furfural and an alkaline catalyst to proceed to a first polymerization reaction to form a phenol-formaldehyde resin precursor solution;
    adding the alkaline catalyst to the phenol-formaldehyde resin precursor solution to proceed to a second polymerization reaction to form a phenol-formaldehyde resin solution; and
    adding an alcohol during the first polymerization reaction, wherein the alcohol and the first phenolic mixture have a weight ratio of 0.25:1-10:1, wherein the alcohol is ethanol, methanol, n-propanol, isopropanol, n-butanol, isobutanol, n-pentanol, n-hexanol or t-butanol.

2. The method for preparing a phenol-formaldehyde resin as claimed in claim 1, wherein the first phenolic mixture comprises at least two of phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methyl pyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol, or 3-allyl-6-methoxy phenol.

3. The method for preparing a phenol-formaldehyde resin as claimed in claim 1, wherein the biomass pyrolysis oil is extracted by an extractant, and the extractant is ethyl acetate, propyl acetate, butyl acetate, methyl isopropyl ketone, methyl isobutyl ketone, methyl i-amyl ketone, ethyl ethyl ketone- or toluene.

4. The method for preparing a phenol-formaldehyde resin as claimed in claim 3, wherein the extractant further comprises a second phenolic compound.

5. The method for preparing a phenol-formaldehyde resin as claimed in claim 4, wherein the second phenolic compound comprises phenol, 2-cresol, 4-cresol, 3-cresol, guaiacol, 2,6-dimethyl phenol, 2,4-dimethyl phenol, 4-ethyl phenol, m-ethyl phenol, 2-methoxy-4-methyl phenol, 1,2-benzenediol, 3,4-xylenol, 4-ethyl-m-cresol, 3-methoxy catechol, 3-methyl pyrocatechol, 1,4-benzenediol, 4-ethyl guaiacol, 4-methyl catechol, 4-vinyl-2-methoxy phenol, 2-methyl-1,4-benzenediol, 2,6-dimethoxy phenol, 2-methoxy-4-propyl phenol, isoeugenol, 2-methoxy-4-propyl phenol, 2,6-dimethoxy-4-allyl phenol, or 3-allyl-6-methoxy phenol, or a combination thereof.

6. The method for preparing a phenol-formaldehyde resin as claimed in claim 4, wherein the second phenolic compound and the biomass pyrolysis oil have a weight ratio of 0.1:1-1:1.

7. The method for preparing a phenol-formaldehyde resin as claimed in claim 1, wherein the furfural and the first phenolic mixture have a weight ratio of 0.1:1-4:1.

8. The method for preparing a phenol-formaldehyde resin as claimed in claim 1, wherein the first polymerization reaction has a reaction temperature greater than or equal to 130° C. and smaller than or equal to 160° C.

9. The method for preparing a phenol-formaldehyde resin as claimed in claim 1, wherein the second polymerization reaction has a reaction temperature greater than or equal to 70° C. and smaller than 130° C.

10. The method for preparing a phenol-formaldehyde resin as claimed in claim 1, further comprising diluting the phenol-formaldehyde resin solution to form a phenol-formaldehyde resin diluent.

11. The method for preparing a phenol-formaldehyde resin as claimed in claim 10, wherein the phenol-formaldehyde resin solution is diluted with a second alcohol.

12. The method for preparing a phenol-formaldehyde resin as claimed in claim 10, further comprising impregnating a matrix with the phenol-formaldehyde resin diluent to form a resin-impregnated material.

13. The method for preparing a phenol-formaldehyde resin as claimed in claim 12, further comprising hot-pressing the resin-impregnated material to form a resin molding material.

14. The method for preparing a phenol-formaldehyde resin as claimed in claim 1, wherein the alcohol and the first phenolic mixture have a weight ratio of 0.25:1-0.6:1.

* * * * *